United States Patent
Sargent et al.

(10) Patent No.: US 6,824,810 B2
(45) Date of Patent: Nov. 30, 2004

(54) CREAMER COMPOSITIONS AND METHODS OF MAKING AND USING THE SAME

(75) Inventors: Jeffrey Alan Sargent, West Chester, OH (US); Francisco Valentino Villagran, Mason, OH (US); Douglas Craig Hardesty, Amelia, OH (US); Peter Yau Tak Lin, Liberty Township, OH (US); Michael Jerome Picca, Covington, KY (US)

(73) Assignee: The Procter & Gamble Co., Cincinnati, OH (US)

( * ) Notice: Subject to any disclaimer, the term of this patent is extended or adjusted under 35 U.S.C. 154(b) by 255 days.

(21) Appl. No.: 10/262,451

(22) Filed: Oct. 1, 2002

(65) Prior Publication Data

US 2004/0062846 A1 Apr. 1, 2004

(51) Int. Cl.$^7$ .................................................. A21D 9/15
(52) U.S. Cl. ........................ 426/588; 426/601; 426/656; 426/657
(58) Field of Search ............................... 426/588, 601, 426/656, 657, 613

(56) References Cited

U.S. PATENT DOCUMENTS

| | | | |
|---|---|---|---|
| 2,469,553 A | 5/1949 | Hall | |
| 2,771,343 A | 11/1956 | Arnold et al. | |
| 2,978,446 A | 4/1961 | Battista et al. | |
| 3,023,104 A | 2/1962 | Battista | |
| 3,141,875 A | 7/1964 | Battista et al. | |
| 3,436,227 A | 4/1969 | Bergeron et al. | |
| 3,493,388 A | 2/1970 | Hair | |
| 3,615,669 A | 10/1971 | Hair et al. | |
| 3,620,756 A | 11/1971 | Strobel et al. | |
| 3,652,293 A | 3/1972 | Lombana et al. | |
| 4,338,346 A | 7/1982 | Brand | |
| 4,399,163 A | 8/1983 | Brennan et al. | |
| 4,411,925 A | 10/1983 | Brennan et al. | |
| 4,423,029 A | 12/1983 | Rizzi | |
| 4,734,287 A | 3/1988 | Singer et al. | |
| 4,911,946 A * | 3/1990 | Singer et al. | 426/658 |
| 4,961,953 A | 10/1990 | Singer et al. | |
| 4,985,270 A * | 1/1991 | Singer et al. | 426/565 |
| 5,147,677 A * | 9/1992 | Ziegler | 426/614 |
| 5,153,020 A * | 10/1992 | Singer et al. | 426/567 |
| 5,284,674 A * | 2/1994 | Fazio | 426/580 |
| 5,322,702 A * | 6/1994 | Selinger et al. | 426/583 |
| 5,490,997 A * | 2/1996 | Devine et al. | 426/573 |
| 5,516,543 A * | 5/1996 | Amankonah et al. | 426/573 |
| 5,536,514 A * | 7/1996 | Bishay et al. | 426/103 |
| 6,180,159 B1 * | 1/2001 | Villagran et al. | 426/590 |
| 6,287,616 B1 * | 9/2001 | Beeson et al. | 426/285 |
| 6,290,997 B1 * | 9/2001 | Villagran et al. | 426/72 |
| 6,379,737 B1 * | 4/2002 | Butterbaugh et al. | 426/594 |
| 6,605,311 B2 * | 8/2003 | Villagran et al. | 426/656 |
| 6,673,384 B1 * | 1/2004 | Villagran et al. | 426/575 |
| 6,759,078 B2 * | 7/2004 | Stuchell | 426/656 |

FOREIGN PATENT DOCUMENTS

| | | | |
|---|---|---|---|
| EP | 0 168 112 | | 1/1986 |
| WO | WO 93/07761 | * | 4/1993 |
| WO | WO 01/97629 A2 | | 12/2001 |
| WO | WO 02/26050 A2 | | 4/2002 |
| WO | WO 02/063973 A2 | | 8/2002 |
| WO | WO 02/074143 A2 | | 9/2002 |
| WO | WO 02/074661 A1 | | 9/2002 |

OTHER PUBLICATIONS

Beeson et al US PgPub 2001/0041211.*

Stuchell US PgPub 2003/0087001.*

Grazela et al. US PgPub 2002/0119232.*

Kirk Othmer Encyclopedia of Chemical Technology, Synthetic and Imitation Dairy Products, W.J. Harper, Willey Interscience, vol. 22, 3$^{rd}$ Ed. (1978), pp. 465–498.

Sivetz & Foote, Coffee Processing Technology, vol. 1, pp. 382–513, Avi Publishing Co. (1963).

(List continued on next page.)

Primary Examiner—Carolyn Paden
(74) Attorney, Agent, or Firm—S. Robert Chuey; Bryn T. Lorentz

(57) ABSTRACT

The present invention relates to powdered and liquid, dairy and non-dairy creamer compositions. These creamer compositions can be prepared in both concentrated and ready-to-use forms. The powdered creamer compositions are well suited for use in instant and/or dry food and beverage compositions that require the addition of water or other suitable fluids prior to use. The present powdered and liquid creamer compositions are equally well suited for the preparation of ready-to-use formulations that can be added directly to food and beverage products. The creamer compositions of the present invention comprise a microparticulated ingredient component and a secondary ingredient component. The microparticulated ingredient component comprises a fat/oil component and a microparticulated protein component, and optionally a carbohydrate component. The secondary ingredient component of the creamer compositions of the present invention comprises an emulsifier and a bulking agent. The weight ratio of the microparticulated ingredient component to the secondary ingredient component is in the range of from about 1:99 to about 5:1, preferably in the range of from about 1:50 to about 5:1, more preferably in the range of from about 1:10 to about 5:1, even more preferably in the range of from about 1:5 to about 5:1. The present creamer compositions may optionally comprise an additional ingredient component, wherein the weight ratio of the secondary ingredient component to the additional ingredient component is in the range of from about 100:1 to about 1:24, preferably in the range of from about 30:1 to about 1:20, more preferably in the range of from about 10:1 to about 1:15, most preferably in the range of from about 2:1 to about 1:10.

25 Claims, No Drawings

OTHER PUBLICATIONS

Swern, D.—"Chapter 5: Sources, Utilization, and Classification of Oils and Fats", Bailey's Industrial Oil & Fat Products, vol. 1, $4^{th}$ Ed., (1979) pp. 271–288.

U.S. patent application Ser. No. 09/885,693, Villagran et al., filed Jun. 20, 2001.

U.S. patent application Ser. No. 09/965,113, Lin et al., filed Sep. 26, 2001.

U.S. patent application Ser. No. 10/074,851, Hardesty et al., filed Feb. 13, 2002.

U.S. patent application Ser. No. 10/098,278, Dalton et al., filed Mar. 15, 2002.

U.S. patent application Ser. No. 10/099,085, Sargent et al., filed Mar. 15, 2002.

* cited by examiner

CREAMER COMPOSITIONS AND METHODS OF MAKING AND USING THE SAME

BRIEF DESCRIPTION OF THE INVENTION

The present invention relates to liquid and powdered dairy and non-dairy creamer compositions and their use in food and beverage products. In particular, the present invention relates to process for making these liquid and powdered dairy and non-dairy creamer compositions.

BACKGROUND OF THE INVENTION

The present invention relates to dairy and non-dairy creamer compositions for use in food and beverage products. In particular, the present invention relates to dairy and non-dairy creamer compositions, in both powdered and liquid form, capable of delivering an improved flavor impact per given unit dosage over the creamer compositions currently employed in the art. The creamer compositions of the present invention are additionally capable of delivering a creamier, richer, improved mouthfeel and thickness over conventional creamer compositions for the same volume of formula.

Another benefit of the present powdered and liquid, dairy and non-dairy creamer compositions are their ability to withstand exposure to conventional treatments for food and beverage products that reduce biological activity and/or promote microbial stability.

Dairy and non-dairy creamers are an increasingly popular additive to or ingredient of many of today's food and beverage products. See for example the synthetic and imitation dairy products disclosed in *Kirk-Othmer Encyclopedia of Chemical Technology*, W. J. Harper, Willey Interscience, $3^{rd}$ edition, Vol. 22, section entitled "Synthetic and Imitation Dairy Products," pp. 465–498, (1978), which is incorporated by reference herein. However, food and beverage products employing conventional creamer compositions are frequently dispreferred because of their cost, taste, and/or texture.

These conventional creamer compositions, in an effort to reduce cost and increase product shelf-life, utilize a high proportion of inactive ingredients that make little or no positive contribution to the desired creamy flavor impact. Moreover, these inactive ingredients, typically bulking agents, suffer from the further deficiency of not being able to withstand the heat and pressure conditions that are part of the food and beverage sterilization and stabilization techniques commonly employed.

As a result of the increased amount of inactive ingredients used in conventional creamer formulations larger amounts of those creamer compositions must be utilized to deliver a given flavor or texture impact, as compared to the creamer compositions of the present invention. The use of large amounts of inactive ingredients also has the deficiency of making impractical the packaging of these conventional creamer compositions in convenient, single-serve portions.

Accordingly it is an object of the present invention to provide powdered and liquid creamer compositions that address one or more of the above mentioned deficiencies of creamer compositions currently known in the art.

It is another object of the present invention to provide powdered and liquid creamer compositions that comprise a microparticulated ingredient component and a secondary ingredient component and exhibit a higher beneficial flavor impact at lower dosage levels of solids.

It is yet another object of the present invention to provide cost effective powdered and liquid creamer compositions with a smooth, emulsion-like organoleptic character that exhibit a higher beneficial flavor impact at a lower dosage levels of solids.

It is yet another object of the present invention to provide heat-stable creamer compositions that exhibit a smooth, emulsion-like organoleptic character, especially when used in sterilized food and beverage products.

It is yet another object of the present invention to provide concentrated powdered and liquid creamer compositions that deliver a full, smooth, emulsion-like organoleptic character, especially when packaged in single-serve dosing portions.

SUMMARY OF THE INVENTION

The present invention relates to powdered and liquid, dairy and non-dairy creamer compositions. These creamer compositions can be prepared in both concentrated and ready-to-use forms. The powdered creamer compositions are well suited for use in instant and/or dry food and beverage compositions that require the addition of water or other suitable fluids prior to use. The present powdered and liquid creamer compositions are equally well suited for the preparation of ready-to-use formulations that can be added directly to food and beverage products.

The creamer compositions of the present invention typically comprise a microparticulated ingredient component and a secondary ingredient component. The microparticulated ingredient component comprises from about 0.1% to about 80% of a fat/oil component and from about 0.1% to about 70% of a microparticulated protein component, when those components are calculated on a weight percentage of the microparticulated ingredient component. In hydrated state microparticulated ingredient component particles have a mean diameter particle size distribution ranging from about 0.1 microns to about 10.0 microns, preferably in the range of from about 0.1 microns to about 8 microns, more preferably in the range of from about 0.1 microns to about 5 microns. Preferably, less than about 5 percent of the total number of particles exceeds the upper end of the mean diameter particle size distribution range (e.g., about 10 microns, preferably about 8 microns, more preferably about 5 microns).

Optionally, the microparticulated ingredient component may additionally comprise from about 0.1% to about 70% of a carbohydrate component. The microparticulated carbohydrate particles may be used to augment, supplement, and/or replace the ingredients of the fat/oil component and/or the protein component of the microparticulated ingredient component.

The secondary ingredient component of the creamer compositions of the present invention comprise from about 0.05% to about 50% of an emulsifier and from about 50% to about 99.5% of a bulking agent, when those components are calculated on a weight percentage of the secondary ingredient component.

For the powdered creamer compositions of the present invention the weight ratio of the microparticulated ingredient component to the secondary ingredient component is in the range of from about 1:99 to about 5:1, preferably in the range of from about 1:50 to about 5:1, more preferably in the range of from about 1:10 to about 5:1, even more preferably in the range of from about 1:5 to about 5:1. For the liquid creamer compositions of the present invention the weight ratio of the microparticulated ingredient component to the secondary ingredient component is in the range of from about 1:99 to about 5:1, preferably in the range of from about 1:50 to about 5:1, more preferably in the range of from about 1:5 to about 5:1, even more preferably in the range of from about 1:1 to about 5:1.

Optionally, the creamer compositions of the present invention may comprise an additional ingredient component, wherein the additional ingredient component comprises ingredients selected from the group consisting of flavorants, milk solids, soluble beverage components, buffers and buffering systems, natural and artificial sweeteners, thickeners, foaming agents and foaming systems, processing aids, and mixtures thereof. If the additional ingredient component is utilized in the present liquid creamer compositions the weight ratio of the secondary ingredient component to the additional ingredient component is in the range of from about 100:1 to about 1:24, preferably in the range of from about 30:1 to about 1:20, more preferably in the range of from about 10:1 to about 1:15, most preferably in the range of from about 2:1 to about 1:10.

DETAILED DESCRIPTION OF THE INVENTION

The present invention encompasses processes for the production of powdered and liquid, dairy and non-dairy creamer compositions, in particular powdered and liquid, dairy and non-dairy creamer compositions with a high degree of functionality. The present invention will now be described in detail with reference to specific embodiments.

A. Definition of Terms

Various publications and patents are referenced throughout this disclosure. All references cited herein are hereby incorporated by reference. Unless otherwise indicated, all percentages and ratios are calculated on a dry weight basis. All percentages and ratios are calculated based on the total dry composition unless otherwise indicated.

All component or composition levels are in reference to the active level of that component or composition, and are exclusive of impurities, for example, residual solvents or by-products, which may be present in commercially available sources.

Referred to herein are trade names for components including various ingredients utilized in the present invention. The inventors herein do not intend to be limited by materials under a certain trade name. Equivalent materials (e.g., those obtained from a different source under a different name or catalog number) to those referenced by trade name may be substituted and utilized in the compositions, kits, and methods herein.

As used herein, and unless otherwise indicated, the use of a numeric range to indicate the value of a given variable is not intended to be limited to just discrete points within that stated range. One of ordinary skill in the art will appreciate that the use of a numeric range to indicate the value of a variable is meant to include not just the values bounding the stated range, but also all values and sub-ranges contained therein. By way of example, consider variable X that is disclosed as having a value in the range of A to B. One of ordinary skill in the art will understand that variable X is meant to include all integer and non-integer values bounded by the stated range of A to B. Moreover, one of ordinary skill in the art will appreciate that the value of the variable also includes all combinations and/or permutations of sub-ranges bounded by the integer and non-integer values within and including A and B.

In the description of the invention various embodiments and/or individual features are disclosed. As will be apparent to the ordinarily skilled practitioner, all combinations of such embodiments and features are possible and can result in preferred executions of the present invention.

B. Sources of Ingredients Used in Concentrated Creamer Compositions

The creamer compositions of the present invention comprise a microparticulated ingredient component and a secondary ingredient component. An additional ingredient component comprising ingredients such as flavorants, beverage solids, sweeteners, foaming systems, processing aids, and the like may also be present.

1. Microparticulated Ingredient Component

The creamer compositions of the present invention comprise a microparticulated ingredient component. The microparticulated ingredient component comprises a fat/oil component and a protein component. The microparticulated ingredient component may optionally comprise a carbohydrate component, of which may comprise in whole or in part, a microcrystalline cellulose component. The carbohydrate component, including any present microcrystalline cellulose component, may be used to supplement, augment, and/or replace portions of the fat/oil component and/or the protein component.

The microparticles that make up the microparticulated ingredient component have, in a hydrated state, a substantially spheroidal shape and display fat-like mouthfeel characteristics. The particles have a mean diameter distribution in the range of from about 0.1 microns to about 10 microns, preferably in the range of from about 0.1 microns to about 8 microns, more preferably in the range of about 0.1 microns to about 5 microns. Moreover, preferably less than about 5% of the total number of microparticles has a diameter in excess of the upper end of the size distribution range (i.e., about 10 microns, preferably about 8 microns, more preferably about 5 microns). More preferably less than about 2% of the total number of microparticles has a diameter in excess of the upper end of the size distribution range. Additionally, the microparticles are substantially non-aggregated and exhibit a substantially smooth organoleptic character of an oil-in-water emulsion.

(i) Fat/Oil Component

The microparticulated ingredient component of the present invention comprises a fat/oil component. As used herein, the terms "fat" and "oils" are used interchangeably. The exact amount of the fat/oil component is dependent on the specific oil selected, or the blend of oils, and the specific creamer formulation and ingredients selected. However, when measured on a dry weight percentage of the microparticulated ingredient component, the fat/oil component is present in amount in the range of from about 0.1% to about 80%.

Suitable oils for use in the compositions of the present invention include any edible oil capable of microparticularization as described herein. The oils can be comprised of completely saturated, partially saturated, unsaturated fatty acids or mixtures thereof. Preferred oils for use in the creamer compositions herein include soybean oil, canola (low erucic acid) oil, corn oil, cottonseed oil, peanut oil, safflower oil, sunflower oil, rapeseed oil, sesame oil, olive oil, coconut oil, palm kernel oil, palm oil, tallow, butter, lard, fish oil, and mixtures thereof. A more detailed discussion of the types of fats and oils suitable for use in the creamer compositions of the present invention is disclosed in *BAILEY'S INDUSTRIAL OIL AND FAT PRODUCTS, VOL. 1*, D. Swern, Willey Interscience, $4^{th}$ edition, Vol. 1, section entitled "Chapter 5, Sources, Utilization, and Classification of Oils and Fats," pp. 271–288, (1979), which is incorporated by reference herein.

(ii) Microparticulated Protein Component

The microparticulated ingredient component of the present invention comprises a microparticulated protein component. The exact amount of the protein component is dependent on the specific creamer formulation and ingredients selected. However, when measured on a dry weight percentage of the microparticulated ingredient component, the protein component is present in amount in the range of from about 0.1% to about 70%.

These microparticulated protein component can be prepared from any protein that can attain a substantially spheroidal or substantially round shape in a diameter size range of from about 0.1 microns to about 10 microns, preferably in the range of from about 0.1 microns to about 8 microns, more preferably in the range of from about 0.1 microns to about 5 microns.

The preferred protein for a particular use may vary according to considerations of availability, expense, and flavor associated with the protein. Additionally, the degree and nature of impurities and other components in the protein source may be considered. Preferred proteins of the present invention are those proteins that are substantially soluble in their undenatured state, and, which undergo denaturation and insolublization upon exposure to heat denaturing temperatures. Suitable protein sources include plant, dairy, and other animal protein sources.

It has been determined according to the present invention that heat-stable, water dispersible protein particles, which in a hydrated state have a substantially smooth, emulsion-like, organoleptic character, may be produced from a variety of protein materials. Preferred proteins for preparing the microparticulated protein component of the present invention include egg and milk proteins, plant proteins (including oilseed proteins obtained from cotton, palm, rape, safflower, cocoa, sunflower, sesame, soy, peanut, and the like), microbial proteins such as yeast proteins, so-called "single cell" proteins, and mixtures thereof. Preferred proteins also include dairy whey protein (including sweet dairy whey protein), and non-dairy proteins such as bovine serum albumin, egg white albumin, and vegetable whey proteins (i.e., non-dairy whey protein) such as soy protein. Especially preferred proteins for use in the present invention include whey proteins, such as β-lactoglobulins and α-lactalbumins; bovine serum albumins; egg proteins, such as ovalbumins; and, soy proteins, such as glycinin and conglycinin. Combinations of these especially preferred proteins are also acceptable for use in the present invention.

Preferred sources for the microparticulated protein particles herein include, but are not limited to, partially insoluble, partially denatured protein compositions such as Simplesse 100®, available from the CP-Kelco Company of San Diego, Calif. and DAIRY-LO® from The Pfizer Company of New York, N.Y., both of which are whey proteins. Examples of these preferred protein sources are disclosed in U.S. Pat. No. 4,734,287 to Singer et al., issued Mar. 29, 1988; and U.S. Pat. No. 4,961,953 to Singer et al., issued Jun. 16, 1989, both of which are herein incorporated by reference. Especially preferred protein particle sources for use in the compositions of the present invention, and methods for making such protein particles sources, are disclosed in co-pending U.S. patent application Ser. No. 09/885,693, filed Jun. 22, 2001 to Francisco V. Villagran et al., which is herein incorporated by reference.

Preferred microparticulated protein particles can be prepared from solutions of partially insoluble, partially denatured protein compositions through controlled application of heat and high shear conditions facilitative of controlled protein denaturation in a physical and chemical context allowing for the formation of non-aggregated, proteinaceous microparticles of the desired size and shape. The particles formed during denaturation are generally spherical in shape and have average diameters in excess of about 0.1 microns. The formation of particles in excess of about 10 microns in diameter and/or formation of aggregates of small particles with aggregate diameters in excess of 10 microns is substantially avoided. Alternatively, the formation of particles or aggregates of particles having volumes in excess of 5.5 cubic microns is avoided while forming substantial numbers of particles having volumes of $5 \times 10^{-4}$ cubic microns or more.

The protein denaturing temperatures employed and the duration of heat treatment will vary depending upon the particular protein starting material. In a like manner, the specific high shear conditions including the duration of shear applied to protein solutions will also vary. During the denaturation processing, undenatured proteins in solution interact to form insoluble coagulates, and the controlled application of heat and high shear forces operate to insure formation of non-aggregated particles within the desired size range. Depending on the protein source selected, the rate of denaturation and the rate of insolublization may differ. Also, depending upon the specific properties of dissolved protein materials and the properties of non-protein constituents in the solutions of these materials, the application of heat and high shear alone may not optimally allow for the avoidance of oversized particle aggregates. In such situations, one or more materials such as lecithin, xanthan gum, maltodextrins, sugars, carageenan, datem esters, alginates, and the like, (referred to as "aggregate blocking agents") can preferably be added to the protein solutions, most preferably prior to heat denaturation processing.

In one embodiment of the present invention the proteins are derived from a dairy protein source, in particular whey proteins. It is recognized that protein sources suitable for use in the present invention may contain various impurities and by-products. For example, whey protein concentrates can comprise as much as 40% lactose. The presence of such materials does not substantially affect the process herein. If desired, lactose-free products can be prepared by using conventional extraction procedures.

(iii) Microparticulated Carbohydrate Component

The microparticulated ingredient component of the creamer compositions of the present invention may optionally comprise a microparticulated carbohydrate component. The microparticulated carbohydrate particles of the microparticulated carbohydrate component may be used to augment, supplement, and/or replace the ingredients of the fat/oil component and/or the protein component of the microparticulated ingredient component. The exact amount of the microparticulated carbohydrate component, if one is included, is dependent on the nature of the specific creamer formulation desired and the remaining ingredients selected. However, when measured on a dry weight percentage of the microparticulated ingredient component, the microparticulated carbohydrate component, if included, is present in amount in the range of from about 0.1% to about 70%.

Suitable carbohydrate microparticles include, but are not limited to, LITA®, a mixture of Zein protein and gum arabic. See for example, U.S. Pat. No. 4,911,946 to Singer et al., issued Mar. 27, 1990; and U.S. Pat. No. 5,153,020 to Singer et al., issued Oct. 6, 1992, both of which are herein incorporated by reference. Other suitable carbohydrates include starches, gums and/or cellulose, as well as mixtures thereof. The starches are typically modified by cross-linking to prevent excessive swelling of the starch granules using methods well known to those skilled in the art. Additional suitable carbohydrates include calcium alginate, cross-linked alginates, dextran, gellan gum, curdlan, konjac mannan, chitin, schizophyllan and chitosan.

The microparticulated carbohydrate particles of the present invention have a substantially spheroidal or substantially round shape, with a mean particle diameter size in the range of from about 0.1 microns to about 10 microns, preferably in the range of from about 0.1 microns to about 8 microns, more preferably in the range of from about 0.1 microns to about 5 microns.

Carbohydrates that do not have a natural round shape must be treated so that they attain a substantially spheroidal or substantially round shape. This can be accomplished by making a solution of the carbohydrate and converting the solution to a gel quickly and uniformly (generally in a field of high shear-force) so that a narrow distribution of a gelled microparticles are formed having the above described diameters. Generally, a stream of carbohydrate solution will be introduced into a highly turbulent reaction zone where the gelled microparticles are formed. High speed mixing and shearing conditions can also be employed.

In one embodiment of the present invention calcium alginate microparticles are formed by making a solution of sodium alginate and introducing this solution into a calcium ion containing solution. Introduction can occur via an ultrasonic spray nozzle or any other device capable producing droplets less than about 10 microns in diameter. In another embodiment of the present invention gellan is microparticulated by spray cooling a hot gellan solution via any device, or combination of devices, capable of producing droplets less than about 10 microns in diameter. This results in is the formation of substantially spheriodally-shaped microparticles. In yet another embodiment konjac mannan is microparticulated by introducing a konjac mannan containing solution into a turbulent, heated, alkaline reaction zone.

Preferred carbohydrate microparticles of the present invention are substantially non-aggregated. Aggregate blocking agents, for example, lecithin and xanthan gum, can be added to the carbohydrate microparticles to stabilize the particles. See U.S. Pat. No. 4,734,287 to Singer et al., issued Mar. 29, 1988, which is herein incorporated by reference.

Suitable carbohydrate microparticles for use in the microparticulated ingredient component of the creamer compositions of the present invention may additionally include microcrystalline cellulose particles. The exact amount of the microcrystalline cellulose component, if one is included, is dependent on the nature of the specific creamer formulation desired and the remaining ingredients selected. Microcrystalline cellulose, which is also known in the art as "cellulose gel," is a non-fibrous form of cellulose that is prepared by partially depolymerizing cellulose obtained as a pulp from fibrous plant material with dilute mineral acid solutions. Following hydrolysis, the hydrocellulose is purified via filtration and the aqueous slurry is spray-dried to form dry, odorless, tasteless, porous particles having a broad size distribution in the range of from about 0.1 microns to about 15 microns. See U.S. Pat. No. 3,023,104, issued Feb. 27, 1962; U.S. Pat. No. 2,978,446; and U.S. Pat. No. 3,141,875, each of which is herein incorporated by reference, that disclose suitable methods of preparing the microcrystalline cellulose used herein. Suitable commercially available microcrystalline cellulose source include EMCOCEL®, from the Edward Mendell Co., Inc. and Avicel®, from FMC Corporation.

Suitable, microcrystalline cellulose sources may also be produced through a microbial fermentation process. Commercially available microcrystalline cellulose produced by a fermentation process includes PrimaCEL™, available from The Nutrasweet Kelco Company of Chicago, Ill.

2. Secondary Ingredient Component

The powdered and liquid, dairy and non-dairy creamer compositions of the present invention comprise a secondary ingredient component. The secondary ingredient component comprises, when measured on a dry weight basis of the secondary ingredient component, from about 0.05% to about 50% of an emulsifier and from about 50% to about 99.5% of a bulking agent.

(i) Emulsifier

Emulsifiers of the type used herein help to disperse fat and oil in the food and beverage products comprising the creamer compositions of the present invention. Any food grade emulsifier suitable for inclusion in edible products can be used. Examples of suitable emulsifiers include mono and diglycerides of long chain fatty acids, preferably saturated fatty acids, and most preferably, stearic and palmitic acid mono and diglycerides. Propylene glycol esters are also useful in these edible mixes. Lecithin is an especially preferred emulsifier in the creamer compositions of the present invention. The emulsifier can be any food compatible emulsifier such as mono and diglycerides, lecithin, sucrose monoesters, polyglycerol esters, sorbitan esters, polyethoxylated glycerols and mixtures thereof.

Other suitable emulsifiers include lactylated mono and diglycerides, propylene glycol monoesters, polyglycerol esters, diacetylated tartaric acid esters of mono- and di-glycerides, citric acid esters of monoglycerides, stearoyl-2-lactylates, polysorbates, succinylated monoglycerides, acetylated monoglycerides, ethoxylated monoglycerides, lecithin, sucrose monoester, and mixtures thereof. Suitable emulsifiers include Dimodan® O, Dimodan® PV, and Panodan® FDP, manufactured by the Danisco Food Ingredients Company. The emulsifiers may optionally be utilized with a co-emulsifier. Depending on the particular formulation chosen, suitable co-emulsifiers may be chosen from any food compatible co-emulsifier or emulsifier. Particularly preferred emulsifier/co-emulsifier systems include Dimodan® O, Dimodan® PV, and Panodan® FDP.

Other suitable emulsifiers include sorbitans, in particular sorbitan esters. Preferred are sorbitan ester compositions having significant levels of sorbitan monoesters. For example, the sorbitan compositions will preferably comprise a sorbitan ester component, wherein the sorbitan ester component comprises at least about 30% (preferably at least about 40%, more preferably at least about 50%), by weight, sorbitan monoesters. In one aspect, the sorbitan ester component will comprise no more than about 10%, by weight, isosorbide or esters thereof. (As used herein, unless otherwise indicated, reference to the weight percent of a given sorbitan entity (e.g., sorbitan monoester, sorbitan diester, isosorbide) is with respect to the total weight of the sorbitan ester component of the composition, not the total weight of the composition itself.)) As used herein, the term "sorbitan ester component" refers to sorbitol, sorbitan and isosorbide, and their esters. The term "sorbitan monoester" refers collectively to any sorbitan positional isomer with one fatty acid esterified to one free hydroxyl group. It will be appreciated by those of ordinary skill in the art that there are numerous ester isomers for a given sorbitan positional isomer, dictated by which free hydroxyl group is esterified, and that use all such isomers are contemplated as being within the scope of the present invention.

Preferred emulsifiers useful in the present invention will be those emulsifiers that exist as a stable dispersion at a temperature of at least about 80° C. Emulsifiers exhibiting this physical behavior are preferred because processing occurs under high temperature conditions, and it is believed that emulsifiers exhibiting the above dispersibility properties are able to function robustly under such conditions. This is in contrast to emulsifiers systems that exist predominantly in the cubic plus water phase, which is a relatively low functional phase. The term "dispersion" refers to an emulsifier system that exists as a colloidal system in water. These systems include dilute lamellar liquid crystal, hexagonal, crystalline and mixed crystalline phases. The term "stable dispersion" refers to a dispersion that exists for at least 5 minutes at the temperature in question. A more detailed discussion of these preferred emulsifiers, including a description of the analytical methods used to test dispersibility can be found in co-pending U.S. Pat. Ser. No. 09/965,113, filed Sep. 26, 2001 to Lin et al., herein incorporated by reference.

Yet other emulsifiers suitable for use in the creamer compositions of the present invention include emulsifiers comprising polyglycerol ester ("PGE"). Preferred are PGEs having a polyglycerol backbone comprising from 2 to about 10 (typically 2 to about 8, more typically 2 to about 5, more typically 2–3) glycerol units, wherein not more than about 40% of the hydroxyl groups of the polyglycerol ester are esterified with fatty acids. For a more detailed discussion of emulsifiers comprising PGEs see co-pending U.S. Patent Ser. No. 09/965,113, filed Sep. 26, 2001 to Lin et al., herein incorporated by reference.

Another emulsifier that can be used, either alone or in combination with other components in the present creamer compositions, is diacetyl tartaric acid ester monoglyceride (DATEM). DATEM is a monoglyceride (having an esterified fatty acid chain length in the range of from about 12 to about 22 carbon atoms) that is esterified with diacetyl tartaric acid. DATEM is formed from the reaction of diacetylated tartaric acid anhydride with monoglycerides. The fatty acid may be saturated or unsaturated. The Iodine Value (IV) of the diacetyl tartaric acid monoglyceride is in the range of from about 1 to about 110. Preferably, the IV is in the range of from about 1 to about 20. The functionality of DATEM is enhanced by adjusting the pH value of the dispersion to a pH value in the rnage of from about 5 to about 7. The reaction of monoglyceride with the anhydride forms a complex mixture of various components, the most prevalent being diacetyl tartaric acid esters of monoglycerides (DATEM I), di-(diacetyl tartaric acid) esters of monoglycerides (DATEM II), diacetyl tartaric acid esters of diglycerides (DATEM III) and monoacetyl mono (diacetyl tartaric acid) esters of monoglycerides (DATEM IV). For a more detailed discussion see Danisco Ingredients Technical Paper TP2-1e, available from the Danisco Cultor Company of New Century, Kans.

(ii) Bulking Agents

The secondary ingredient component of the creamer compositions of the present invention comprises a bulking agent. Bulking agents are defined herein as those ingredients that do not substantially contribute to the overall mouthfeel, texture, or taste of the powdered and liquid, dairy and non-dairy creamer compositions of the present invention. The primary purpose of bulking agents is to control the overall concentration of solids in solution. Control of the solids level in solution aides in controlling the final particle size and density of the creamer compositions during various composition drying process, particularly spray drying. Control over the solids level also aides in controlling the viscosity of the liquid creamer composition during processing, and in the final, ready-to-use form of the composition. Bulking agents preferably have a high degree of solubility in solution and should undergo little or no reaction with other creamer composition ingredients.

Suitable bulking agents are selected from the group consisting of corn syrup solids, maltodextrin and various dextrose equivalents, starches, and mixtures thereof. Corn syrup solids are particularly preferred bulking agents because of their cost and processablity.

3. Additional Ingredient Component

The powdered and liquid, dairy and non-dairy creamer compositions of the present invention may optionally comprise an additional ingredient component. The additional ingredient component may include such optional ingredients as flavorants, milk solids, soluble beverage components, sweeteners, foaming systems, processing aids, and the like.

Optional Ingredients (i) Milk Solids

The creamer compositions of the present invention may optionally comprise non-microparticulated dairy proteins (e.g., milk solids). These milk solids can be prepared by drying milk to produce a mixture of the proteins, minerals, whey and other components of milk in a dry form. The milk solids may include butterfat solids and cream powder, and preferably include low-fat dry milk and non-fat milk solids. Especially preferred milk solids are those milk solids derived from milk that has had the fat removed.

Suitable milk solids for use in the present invention can be derived from a variety of commercial sources. Dry mixes typically used to prepare ice cream, milk-shakes, and frozen desserts may also be included in the creamer compositions herein. These dry mixes provide an especially creamy, rich mouthfeel to the creamer composition when the creamer compositions of the present invention are mixed with water or other beverage or food product.

(ii) Soluble Beverage Components

The creamer compositions of the present invention may optionally comprise soluble beverage components. Suitable soluble beverage components are readily available to, and can be easily chosen by, one having ordinary skill in the art. Soluble beverage components include, but are not limited to, coffee, tea, juice, and mixtures thereof. The soluble beverage components may be in liquid, solid concentrate, powder, extract, or emulsion form.

The preferred soluble beverage component for use in a given flavored beverage product containing the creamer compositions of the present invention is determined by the particular application of the creamer composition product. For example, if the final application is intended to be a coffee beverage, the soluble beverage component is, generally, coffee. For a tea or juice beverage product, the soluble beverage component is generally, tea or juice, respectively.

Suitable soluble coffee components, for use in a given flavored beverage product containing the creamer compositions of the present invention, can be prepared by any convenient process. A variety of such processes are known to those skilled in the art. Typically, soluble coffee is prepared by roasting and grinding a blend of coffee beans, extracting the roast and ground coffee with water to form an aqueous coffee extract, and drying the extract to form instant coffee. Soluble coffee useful in the present invention is typically obtained by conventional spray drying processes.

Representative spray drying processes that can provide suitable soluble coffee are disclosed in, for example, pages 382–513 of Sivetz & Foote, *COFFEE PROCESSING TECHNOLOGY*, Vol. I (Avi Publishing Co. 1963); U.S. Pat. No. 2,771,343 (Chase et al), issued Nov. 20, 1956; U.S. Pat.

No. 2,750,998 (Moore), issued Jun. 19, 1956; and U.S. Pat. No. 2,469,553 (Hall), issued May 10, 1949, each of which is incorporated herein by reference. Other suitable processes for providing instant coffee for use in the present invention are disclosed in, for example, U.S. Pat. No. 3,436,227 (Bergeron et al), issued Apr. 1, 1969; U.S. Pat. No. 3,493,388 (Hair), issued Feb. 3, 1970; U.S. Pat. No. 3,615,669 (Hair et al), issued Oct. 26, 1971; U.S. Pat. No. 3,620,756, (Strobel et al), issued Nov. 16, 1971; U.S. Pat. No. 3,652,293 (Lombana et al), issued Mar. 28, 1972, each of which is incorporated herein by reference.

In addition to spray dried instant coffee powders, instant coffee useful in the present invention can include freeze-dried coffee. The instant coffee can be prepared from any single variety of coffees or a blend of different varieties. The instant coffee can be decaffeinated or undecaffeinated and can be processed to reflect a unique flavor characteristic such as espresso, French roast, or the like.

(iii) Buffers

The creamer compositions of the present invention may optionally comprise a buffering system. Suitable buffering systems for use herein are capable of maintaining the pH value of the finished, ready to consume food or beverage product including the present creamer compositions in the range of from about 5.5 to about 7.2. Preferred buffering systems comprise stabilizing salts capable of improving the colloidal solubility of proteins and simultaneously maintaining the pH value of a beverage in the range of from about 5.5 to 7.2, in order to achieve optimum stability and flavor.

Preferred stabilizing salts include the disodium and/or dipotassium salts of citric acid and/or phosphoric acid. The use of phosphate salts is particularly desirable when the water used for the preparation of the beverage is high in calcium or magnesium.

Suitable buffering systems for use in the creamer compositions of the present invention may also be combined with flavor profile mimicking, matching, manipulation and/or adjustment systems comprising various taste contributing acids and bases. Especially preferred flavor profile mimicking, matching, manipulation and/or adjustment systems for use in the present invention are disclosed in co-pending U.S. patent application Ser. No. 10/074,851, filed Feb. 13, 2002 to Hardesty et al., which is incorporated herein by reference.

(iv) Thickeners

The creamer compositions of the present invention may optionally comprise one or more thickening agents. As used herein, the term "thickening agent" includes natural and synthetic gums, and natural and chemically modified starches. It is preferred that the thickening agents of the present invention be comprised predominately of starches, and that no more than 20%, preferably no more than 10%, of the thickener be comprised of gums.

Suitable starches for use herein include, but are not limited to, pregelatinized starch (corn, wheat, tapioca), pregelatinized high amylose content starch, pregelatinized hydrolyzed starches (maltodextrins, corn syrup solids), chemically modified starches such as pregelatinized substituted starches (e.g., octenyl succinate modified starches such as N-Creamer®, N-Lite LP®, and TEXTRA®, manufactured by the National Starch Company), as well as mixtures of these starches. Suitable gums for use herein include locust bean gum, guar gum, gellan gum, xanthan gum, gum ghatti, modified gum ghatti, tragacanth gum, carrageenan, and/or anionic polymers derived from cellulose such as carboxymethylcellulose, sodium carboxymethylcellulose, as well as mixtures of these gums.

(v) Foaming Agents

The creamer compositions of the present invention may optionally comprise foaming agents and/or a foaming system for generating consumer preferred amounts of foam in a finished beverage product comprising the present creamer compositions. Suitable foaming systems for use in the present invention include any compound, or combination of compounds, capable of rendering a desired foam head, of a given height and density, in the finished beverage product. Preferred foaming systems for use herein comprise an acid ingredient and a carbonate and/or bicarbonate ingredient, that when allowed to react together generate foam.

As used herein, the term "acid ingredient" refers to an edible, water-soluble, organic or inorganic acid. Preferred acids include, but are not limited to, citric acid, malic acid, tartaric acid, fumaric acid, succinic acid, phosphoric acid, as well as mixtures of these acids. As used herein, the term "Carbonate" and "Bicarbonate" refer to an edible, water-soluble carbonate or bicarbonate salt that evolves carbon dioxide when it reacts with the acid ingredient. Preferred carbonate and bicarbonate salts include, but are not limited to, sodium bicarbonate, sodium carbonate, potassium bicarbonate, potassium bicarbonate, as well as any mixture thereof. Mixtures of sodium carbonate and sodium bicarbonate are especially preferred when used in combination with citric acid.

The foaming agents and/or foaming systems may optionally comprise one or more foam stabilizing ingredients. Suitable proteinaceous foam stabilizers include non-microparticulated egg white albumin (ovalbumin), whey protein, soy protein, soy protein isolate, corn protein isolate, as well as mixtures of these stabilizers. Non-microparticulated dried egg white albumin is particularly preferred because of its ability to form stable foams at relatively low concentrations.

(vi) Sweeteners

The creamer compositions of the present invention may optionally comprise one or more sweeteners. Preferred sweeteners for use in the present invention include, but are not limited to, sugars and sugar alcohols such as sucrose, fructose, dextrose, maltose, lactose, high fructose corn syrup solids, invert sugar, sugar alcohols, including sorbitol, as well as mixtures of these sugars and sugar alcohols.

In embodiments of the present invention where it is preferable to deliver lower levels of solids per dosage, it is particularly preferred to use a higher intensity sweetener with the sugar or sugar alcohol. These higher intensity sweeteners include saccharin; cyclamates; acesulfame K; L-aspartyl-L-phenylalanine lower alkyl ester sweeteners (e.g., aspartame); L-aspartyl-D-alanine amides, disclosed in U.S. Pat. No. 4,411,925 to Brennan et al.; L-aspartyl-D-serine amides, disclosed in U.S. Pat. No. 4,399,163 to Brennan et al; L-aspartyl-L-1-hydroxymethylalkaneamide sweeteners, disclosed in U.S. Pat. No. 4,338,346 to Brand et al.; L-aspartyl-1-hydroxyethyalkaneamide sweeteners, disclosed in U.S. Pat. No. 4,423,029 to Rizzi; and L-aspartyl-D-phenylglycine ester and amide sweeteners, disclosed in European Patent Application 168,112 to J. M. Janusz, published Jan. 15, 1986. Mixtures of the high intensity sweeteners disclosed herein, as well as mixtures of the high intensity sweeteners and sugars and sugar alcohols, are equally suitable for use in the creamer compositions of the present invention.

A particularly preferred sweetener system is a combination of sucrose with aspartame and acesulfame K. This mixture not only enhances sweetness, but also lowers the level of solids that is required in preparing the food and beverage products comprising the present creamer composition.

(vii) Processing Aids

The creamer compositions of the present invention may optionally comprise processing aids, including flow aids, anti-caking agents, dispersing aids, and the like. Preferred processing aides include, but are not limited to, flow aids such as silicon dioxide and silica aluminates. Starches, aside from the thickening agents, can also be included to keep the various ingredients from caking.

(viii) Flavorants

The creamer compositions of the present invention may optionally comprise one or more flavorants used to deliver one or more specific flavor impacts. Preferred flavors of the type used herein are typically obtained from encapsulated and/or liquid flavorants. These flavorants can be natural or artificial in origin. Preferred flavors, or mixtures of flavor, include almond nut, amaretto, anisette, brandy, cappuccino, mint, cinnamon, cinnamon almond, creme de menthe, Grand Mariner, peppermint stick, pistachio, sambuca, apple, chamomile, cinnamon spice, creme, creme de menthe, vanilla, French vanilla, Irish creme, Kahlua, mint, peppermint, lemon, macadamia nut, orange, orange leaf, peach, strawberry, grape, raspberry, cherry, coffee, chocolate, cocoa, mocha and the like, and mixtures thereof. The creamer compositions of the present invention may also comprise aroma enhancers such as acetaldehyde, herbs, spices, as well as mixtures thereof.

4. Water

In addition to existing in powdered form, the creamer compositions of the present invention may also be prepared in dilute, ready-to-use and concentrated liquid formulations by the addition of water. Generally, a concentrated liquid creamer formulation comprises from about 20% to about 60% on a total formula weight basis of water. A more dilute, ready-to-use liquid creamer formulation would generally comprise from about 61% to about 95% water on a total formula weight basis.

C. Ratio of Ingredient Components and Total Formula Volume

The powdered and liquid, dairy and non-dairy creamer products of the present invention deliver a creamy, rich, improved mouthfeel and thickness to the beverage or food products in which they are employed. Moreover, the instant creamer compositions have a clean, higher flavor impact, at a lower dosage of without the "sliminess" or "stringiness" of conventional creamer compositions. The creamer composition may be prepared in liquid or powdered and concentrated or ready-to-use formulations.

The organoleptic benefits of the compositions of the present invention are achieved by formulating the powdered creamer products so that the weight ratio of the microparticulated ingredient component to the secondary ingredient component is in the range of from about 1:99 to about 5:1, preferably in the range of from about 1:50 to about 5:1, more preferably from about 1:10 to about 5:1, most preferably from about 1:5 to about 5:1. For liquid formulations the weight ratio of the microparticulated ingredient component to the secondary ingredient component is in the range of from about 1:99 to about 5:1, preferably in the range of from about 1:50 to about 5;1, more preferably from about 1:5 to about 5:1, most preferably from about 1:1 to about 5:1.

If an additional ingredient component is utilized in a powdered creamer composition of the present invention the weight ratio of the secondary ingredient component to the additional ingredient component is in the range of from about 100:1 to about 1:24, preferably in the range of from about 50:1 to about 1:24, more preferably in the range of from about 10:1 to about 1:15, most preferably in the range of from about 5:1 to about 1:5. For liquid creamer compositions the weight ratio of the secondary ingredient component to the additional ingredient component is in the range of from about 100:1 to about 1:24, preferably in the range of from about 30:1 to about 1:20, more preferably in the range of from about 10:1 to about 1:15, most preferably in the range of from about 2:1 to about 1:10.

The inventors have found that the creamer compositions of the present invention provide the additional benefit of delivering a richer, creamier, texture and a greater flavor impact over conventional creamer compositions. These texture and flavor benefits result in creamer formulations of smaller total formula volume that can deliver the same or greater flavor and organoleptic benefits as those of conventional creamers. In one embodiment of the present invention the creamer compositions are used in conjunction with single serve beverage-brewing devices of the types described in co-pending U.S. patent application Ser. No. 10/098,278, filed Mar. 15, 2002 to Dalton et al., and co-pending U.S. patent application Ser. No. 10/099,085, filed Mar. 15, 2002 to Dalton et al.

When the dried, homogenized creamer compositions of the present invention are placed in a solution of 35% Creamer Composition and 65% $H_2O$, on a weight basis, and measured at about 37° C. on a Brookfield LVDN-III Rheometer, operating at a speed setting of 20 rpm, and using a #00 measurement spindle, they have a viscosity in the range of from about 20 centipoise to about 60 centipoise. When the homogenized, liquid creamer compositions of the present invention are prepared in ready-to-use form at about 37° C. on a Brookfield LVDN-III Rheometer, operating at a speed setting of 20 rpm, and using a #00 measurement spindle, they have a viscosity in the range of from about 20 centipoise to about 60 centipoise.

D. Methods of Making

The powdered and liquid, dairy and non-dairy creamer compositions of the present invention are prepared by first heating the fat/oil component of the microparticulated ingredient component to a temperature sufficient to substantially completely liquefy the fat/oil component. The specific fat/oil ingredient(s) selected will determine the exact temperature required. Preferably, however, the temperature selected will be sufficient to completely liquefy the fat/oil component.

Once the fat/oil component is sufficiently liquefied the oil is maintained at a temperature sufficient to maintain the fat/oil component as a liquid. A sufficient amount of water and agitation are then applied to form a stable oil/water emulsion. Agitation is continued and the microparticulated protein component is then added to the emulsion. The emulsifier of the secondary ingredient component is added, again in the presence of agitation, followed by the bulking agent and any remaining secondary ingredient components and the additional ingredient components. Agitation is continued until all dry ingredients are completely wetted.

The resulting mixture is then homogenized. The homogenizer is run at a first stage setting in the range of from about 300 psi to about 1000 psi, preferably in the range of from about 400 psi to about 800 psi, more preferably about 500 psi. The second stage of the homogenizer device is set to run at a pressure setting in the range of from about 1000 psi to about 3000 psi, preferably in the range of from about 1500 psi to about 2500 psi, more preferably about 2000 psi.

To produce the powdered creamer compositions of the present invention the resulting homogenized composition is dried to a free moisture content of less than about 7%, preferably less than about 5%, preferably to a free moisture content of less than about 4%. Once dried, the powdered creamer compositions may be packaged utilizing any of a variety of packaging techniques known in the art.

In one embodiment of the present invention the dried powdered creamer composition is packaged in a single serve portion package. In another embodiment the single serve portion of the powdered creamer composition is used in combination with a single-serve portion package of coffee that is used to make a coffee beverage. In yet another embodiment of the present invention the single-serve portion package contains a plurality of chambers wherein the coffee ingredients and the powdered creamer composition are each contained within separate chambers. In yet another embodiment the powdered creamer composition and the coffee ingredients are combined in one or more chambers of a single-serve portion package.

To produce the liquid creamer compositions of the present invention the step of drying the homogenized mixture is omitted. The liquid, homogenized mixture may instead be subject to one or more food and beverage sterilization processes, such as UHT and/or retorting, to render the compositions microbially stable and increase product shelf life. Optionally or additionally, the homogenized liquid creamer composition may be subjected to one or more additional processing steps such as, for example, concentrating. The liquid creamer compositions of the present invention may be prepared in dilute, ready-to-use formulations or may be prepared in liquid concentrated form, requiring the addition of additional amounts of water or other such fluid prior to consumption. Such concentrated liquid creamer compositions are particularly well suited for industrial and/or commercial applications.

Once the liquid creamer compositions have been prepared they may then be packaged using any one of a variety of aseptic or non-aseptic packaging processes know in the art. In one embodiment of the present invention a concentrated, liquid creamer composition is prepared, UHT processed and packaged in a large volume dispensing package suitable for use commercial applications. In another embodiment of the present invention liquid creamer composition is UHT processed and packaged in a single-serve portion package. In another embodiment the single-serve portion of the liquid creamer composition is used in combination with a single-serve portion package of powdered or liquid coffee that is used to make a coffee beverage. In yet another embodiment of the present invention the single-serve portion package contains a plurality of chambers wherein the coffee ingredients and the liquid creamer composition are each contained within separate chambers. In yet another embodiment, a single-serve portion of a concentrated liquid creamer composition is prepared and packaged with a single serve portion of a concentrated liquid coffee. The two concentrated liquids are packaged in a single-chamber beverage brewing device. Hot water is introduced to the single-chamber beverage brewing device in such a manner so as to dilute the two concentrates and prepare a single-serve portion of a creamy coffee beverage.

E. EXAMPLES

The following examples further describe and demonstrate embodiments within the scope of the present invention. These examples are given solely for the purpose of illustration and are not to be construed as a limitation of the present invention, as many variations thereof are possible without departing from the invention's spirit and scope.

Example 1

A creamer composition is prepared from the ingredients and in the amounts presented in Table 1:

TABLE 1

|  | Percentage of Ingredient Component | Dry weight percentage of total formula |
|---|---|---|
| Microparticulated Ingredient Component | | |
| i) Fat/Oil Component | | |
| Coconut Oil | 38.46% | 25% |
| Canola Oil | 38.46% | 25% |
| ii) Protein Component | | |
| Microparticulated Whey Protein | 23.08% | 15% |
| Secondary Ingredient Component | | |
| i) Emulsifier | | |
| Sodium Caseinate | 5.7% | 2% |
| Mono and Diglycerides | 2.85% | 1% |
| ii) Bulking Agent | | |
| Corn Syrup Solids | 91.45% | 32% |
| Total | | 100% |

A 100 g sample of the creamer composition of Table 1 is prepared by first heating the Coconut and Canola Oil to about 200° F. in a 400 ml Pyrex beaker. The temperature is selected to ensure that the fat/oil component is completely liquefied. The temperature is maintained at about 200° F. and 50 ml of water is added to the liquefied oil. Agitation is applied to the liquefied oil/water mixture using an IKA high shear mixer (available from the IKA-Werke Company of Germany). The IKA mixer is set on a No. 6 speed setting.

The microparticulated whey protein is added to the liquefied oil/water mixture in the continued presence of agitation. The sodium caseinate and the mono- and di-glycerides are added and agitation is continued for approximately 5 minutes. The corn syrup solids are added and agitation is continued until all dry ingredients are thoroughly wetted, approximately 5 minutes.

The resulting mixture is then homogenized using an APV Gaulin Model15MR Homogenizer (available from the APV Gaulin Company of Denmark). The homogenizer is run at a first stage setting of 500 psi and a second stage setting 2000 psi.The resulting homogenized composition is dried to a free moisture content of about 3% utilizing an Yamato countercurrent bench top spray dryer.

Example 2

A powdered, dairy creamer composition is prepared from the ingredients and in the amounts presented in Table 2:

TABLE 2

|  | Percentage of Ingredient Component | Dry weight percentage of total formula |
|---|---|---|
| Microparticulated Ingredient Component | | |
| i) Fat/Oil Component | | |
| Coconut Oil | 38.46% | 27.5% |
| Canola Oil | 38.46% | 27.5% |
| ii) Protein Component | | |
| Microparticulated Whey Protein (Simplesse 100) | 23.08% | 15% |
| Secondary Ingredient Component | | |
| i) Emulsifier | | |
| Sodium Caseinate | 25% | 2% |
| Mono and Diglycerides | 12.5% | 1% |
| ii) Bulking Agent | | |
| Corn Syrup Solids | 62.5% | 5% |
| Additional Ingredient Component | | |
| i) Beverage Solids | | |
| Milk Protein Concentrate 80% | 36.36% | 8% |
| Modified tapioca Starch | 31.82% | 7% |
| Instant Coffee | 31.82% | 7% |
| Total | | 100% |

A 100 g sample of the creamer composition of Table 2 is prepared by first heating the Coconut and Canola Oil to about 200° F. in a 400 ml Pyrex beaker. The temperature is selected to ensure that the fat/oil component is completely liquefied. The temperature is maintained at about 200° F. and 50 ml of water is added to the liquefied oil. Agitation is applied to the liquefied oil/water mixture using an IKA high shear mixer (available from the IKA-Werke Company of Germany). The IKA mixer is set on a No. 6 speed setting.

The microparticulated whey protein is added to the liquefied oil/water mixture in the continued presence of agitation. The sodium caseinate and the mono- and di-glycerides are added and agitation is continued for approximately 5 minutes. Then the corn syrup solids and the beverage solids of the additional ingredient component are added. Application of agitation is continued until all dry ingredients are thoroughly wetted, approximately 5 minutes.

The resulting mixture is then homogenized using an APV Gaulin Model15MR Homogenizer (available from the APV Gaulin Company of Denmark). The homogenizer is run at a first stage setting of 500 psi and a second stage setting 2000 psi. The resulting homogenized composition is dried to a free moisture content of about 3% utilizing an Yamato countercurrent bench top spray dryer.

Example 3

A powdered, dairy creamer composition is prepared from the ingredients and in the amounts presented in Table 3:

TABLE 3

|  | Percentage of Ingredient Component | Dry weight percentage of total formula |
|---|---|---|
| Microparticulated Ingredient Component | | |
| i) Fat/Oil Component | | |
| Canola Oil | 52.63% | 30% |
| ii) Protein Component | | |
| Microparticulated Whey Protein (Simplesse 100) | 43.86% | 25% |
| iii) Microparticulated Carbohydrate Component- Microcrystalline Cellulose Avicel RC-591F (FMC Corporation) | 3.51% | 2% |
| Secondary Ingredient Component | | |
| i) Emulsifier | | |
| Sodium Caseinate | 6.67% | 2% |
| Mono and Diglycerides | 3.33% | 1% |
| ii) Bulking Agent | | |
| Corn Syrup Solids | 90% | 27% |
| Additional Ingredient Component | | |
| i) Beverage Solids | | |
| Milk Protein Concentrate 80% | 38.46% | 5% |
| Modified tapioca Starch | 38.46% | 5% |
| Instant Coffee | 23.08% | 3% |
| Total | | 100% |

A 100 g sample of the creamer composition of Table 3 is prepared by first heating the Canola Oil to about 200° F. in a 400 ml Pyrex beaker. The temperature is selected to ensure that the fat/oil component is completely liquefied. The temperature is maintained at about 200° F. and 50 ml of water is added to the liquefied oil. Agitation is applied to the liquefied oil/water mixture using an IKA high shear mixer (available from the IKA-Werke Company of Germany). The IKA mixer is set on a No. 6 speed setting.

The microparticulated whey protein and the Avicel RC-591F, available from the FMC Corporation of Philadelphia, Pa., are added to the liquefied oil/water mixture in the continued presence of agitation. The sodium caseinate and the mono- and di-glycerides are added and agitation is continued for approximately 5 minutes. The corn syrup solids are added, followed by the beverage solids of the additional ingredient component. Application of agitation is continued until all dry ingredients are thoroughly wetted, approximately 5 minutes.

The resulting mixture is then homogenized using an APV Gaulin Model15MR Homogenizer (available from the APV Gaulin Company of Denmark). The homogenizer is run at a first stage setting of 500 psi and a second stage setting 2000 psi. The resulting homogenized composition is dried to a free moisture content of about 3% utilizing an Yamato countercurrent bench top spray dryer.

Example 4

A powdered, non-dairy creamer composition is prepared from the ingredients and in the amounts presented in Table 4:

TABLE 4

| | Percentage of Ingredient Component | Dry weight percentage of total formula |
|---|---|---|
| Microparticulated Ingredient Component | | |
| i) Fat/Oil Component | | |
| Canola Oil | 83.34% | 1% |
| ii) Protein Component | | |
| Microparticulated Whey Protein (Simplesse 100) | 8.33% | 0.1% |
| iii) Microparticulated Carbohydrate Component- Microcrystalline Cellulose | | |
| Avicel RC-591F (FMC Corporation) | 8.33% | 0.1% |
| Secondary Ingredient Component | | |
| i) Emulsifier | | |
| Sodium Caseinate | 2.02% | 2% |
| Mono and Diglycerides | 1.01% | 1% |
| ii) Bulking Agent | | |
| Corn Syrup Solids | 96.97% | 95.8% |
| Total | | 100% |

A 100 g sample of the creamer composition of Table 4 is prepared by first heating the Canola Oil to about 200° F. in a 400 ml Pyrex beaker. The temperature is selected to ensure that the fat/oil component is completely liquefied. The temperature is maintained at about 200° F. and 50 ml of water is added to the liquefied oil. Agitation is applied to the liquefied oil/water mixture using an IKA high shear mixer (available from the IKA-Werke Company of Germany). The IKA mixer is set on a No. 6 speed setting.

The microparticulated whey protein and the Avicel RC-591F, available from the FMC Corporation of Philadelphia, Pa., are added to the liquefied oil/water mixture in the continued presence of agitation. The sodium caseinate and the mono- and di-glycerides are added and agitation is continued for approximately 5 minutes. The corn syrup solids are added and the application of agitation is continued until all dry ingredients are thoroughly wetted, approximately 5 minutes.

The resulting mixture is then homogenized using an APV Gaulin Model15MR Homogenizer (available from the APV Gaulin Company of Denmark). The homogenizer is run at a first stage setting of 500 psi and a second stage setting 2000 psi. The resulting homogenized composition is dried to a free moisture content of about 3% utilizing an Yamato countercurrent bench top spray dryer.

Example 5

A powdered, dairy creamer composition is prepared from the ingredients and in the amounts presented in Table 5:

TABLE 5

|  | Percentage of Ingredient Component | Dry weight percentage of total formula |
|---|---|---|
| Microparticulated Ingredient Component | | |
| i) Fat/Oil Component | | |
| Canola Oil | 82.35% | 70% |
| ii) Protein Component | | |
| Microparticulated Whey Protein (Simplesse 100) | 17.65% | 15% |
| Secondary Ingredient Component | | |
| i) Emulsifier | | |
| Sodium Caseinate | 33.33% | 5% |
| Mono and Diglycerides | 33.33% | 5% |
| ii) Bulking Agent | | |
| Corn Syrup Solids | 33.34% | 5% |
| Total | | 100% |

A 100 g sample of the creamer composition of Table 5 is prepared by first heating the Canola Oil to about 200° F. in a 400 ml Pyrex beaker. The temperature is selected to ensure that the fat/oil component is completely liquefied. The temperature is maintained at about 200° F. and 50 ml of water is added to the liquefied oil. Agitation is applied to the liquefied oil/water mixture using an IKA high shear mixer (available from the IKA-Werke Company of Germany). The IKA mixer is set on a No. 6 speed setting.

The microparticulated whey protein is added to the liquefied oil/water mixture in the continued presence of agitation. The sodium caseinate and the mono- and di-glycerides are added and agitation is continued for approximately 5 minutes. The corn syrup solids are added and the application of agitation is continued until all dry ingredients are thoroughly wetted, approximately 5 minutes.

The resulting mixture is then homogenized using an APV Gaulin Model15MR Homogenizer (available from the APV Gaulin Company of Denmark). The homogenizer is run at a first stage setting of 500 psi and a second stage setting 2000 psi. The resulting homogenized composition is dried to a free moisture content of about 3% utilizing an Yamato countercurrent bench top spray dryer.

Example 6

A liquid, dairy creamer composition is prepared from the ingredients and in the amounts presented in Table 6:

TABLE 6

|  | Percentage of Ingredient Component | Weight percentage of total formula |
|---|---|---|
| Microparticulated Ingredient Component | | |
| i) Fat/Oil Component | | |
| Coconut Oil | 37.44% | 8.5% |
| Canola Oil | 37.44% | 8.5% |
| ii) Protein Component | | |
| Microparticulated Whey Protein (Simplesse 100) | 25.12% | 5.7% |
| Secondary Ingredient Component | | |
| i) Emulsifier | | |
| Sodium Caseinate | 10.17% | 0.6% |
| Mono and Diglycerides | 5.08% | 0.3% |
| ii) Bulking Agent | | |
| Corn Syrup Solids | 84.75% | 5% |
| Additional Ingredient Component | | |
| i) Beverage Solids | | |
| Milk Protein Concentrate 80% | 10.75% | 2.3% |
| Instant Coffee | 12.62% | 2.7% |
| ii) Sweetener | | |
| Sucrose | 76.30% | 16.33% |
| Acesulfame Potassium | 0.33% | 0.07% |
| Water | 100% | 50% |
| Total | | 100% |

A 100 g sample of the creamer composition of Table 6 is prepared by first heating the Coconut and Canola Oil to about 200° F. in a 400 ml Pyrex beaker. The temperature is selected to ensure that the fat/oil component is completely liquefied. The temperature is maintained at about 200° F. and 50 ml of water is added to the liquefied oil. Agitation is applied to the liquefied oil/water mixture using an IKA high shear mixer (available from the IKA-Werke Company of Germany). The IKA mixer is set on a No. 6 speed setting.

The microparticulated whey protein is added to the liquefied oil/water mixture in the continued presence of agitation. The sodium caseinate and the mono- and di-glycerides are added and agitation is continued for approximately 5 minutes. The corn syrup solids, MPC-80 (80% milk protein concentrate), instant coffee, sucrose, and acesulfame potassium are added to the mixture and agitation is continued until all dry ingredients are thoroughly wetted, approximately 5 minutes.

The resulting mixture is then homogenized using an APV Gaulin Model15MR Homogenizer (available from the APV Gaulin Company of Denmark). The homogenizer is run at a first stage setting of 500 psi and a second stage setting 2000 psi. The resulting homogenized composition is UHT processed utilizing a VTIS direct steam injection unit available from the tetra Pak company of Lund, Sweden. The VTIS unit comprises a tubular preheat and final cool system to simulate regenerative heating, a steam injection sterilizer, and a flash cooling vacuum chamber. The homogenized composition is preheated to approximately 170° F., sterilized at a temperature of 294° F. for 3.5 seconds, and flash cooled to approximately 170° F. The composition is homogenized again at a first stage setting of 500 psi and a second stage setting 2000 psi, cooled to a temperature of 105° F., and then ascetically packaged in glass bottles.

Example 7

A powdered, non-dairy creamer composition is prepared from the ingredients and in the amounts presented in Table 7:

temperature is maintained at about 200° F. and 50 ml of water is added to the liquefied oil. Agitation is applied to the liquefied oil/water mixture using an IKA high shear mixer (available from the IKA-Werke Company of Germany). The IKA mixer is set on a No. 6 speed setting.

The microparticulated whey protein and the Avicel RC-591F, available from the FMC Corporation of Philadelphia, Pa., are added to the liquefied oil/water mixture in the continued presence of agitation. The sodium caseinate and the mono- and di-glycerides are added and agitation is continued for approximately 5 minutes. The corn syrup solids and the modified tapioca starch are added. Application of agitation is continued until all dry ingredients are thoroughly wetted, approximately 5 minutes.

The resulting mixture is then homogenized using an APV Gaulin Model15MR Homogenizer (available from the APV Gaulin Company of Denmark). The homogenizer is run at a first stage setting of 500 psi and a second stage setting 2000 psi. The resulting homogenized composition is dried to a free moisture content of about 3% utilizing an Yamato countercurrent bench top spray dryer.

Example 8

A powdered, dairy creamer composition is prepared from the ingredients and in the amounts presented in Table 8:

TABLE 7

|  | Percentage of Ingredient Component | Dry weight percentage of total formula |
|---|---|---|
| Microparticulated Ingredient Component | | |
| i) Fat/Oil Component | | |
| Canola Oil | 83.4% | 50% |
| ii) Protein Component | | |
| Microparticulated Whey Protein (Simplesse 100) | 0.1% | 0.1% |
| iii) Microparticulated Carbohydrate Component- Microcrystalline Cellulose | | |
| Avicel RC-591F (FMC Corporation) | 16.5% | 9.9% |
| Secondary Ingredient Component | | |
| i) Emulsifier | | |
| Sodium Caseinate | 6% | 2% |
| Mono and Diglycerides | 3% | 1% |
| ii) Bulking Agent | | |
| Corn Syrup Solids | 91% | 30% |
| Additional Ingredient Component | | |
| i) Beverage Solids | | |
| Modified Tapioca Starch | 100% | 7% |
| Total | | 100% |

A 100 g sample of the creamer composition of Table 7 is prepared by first heating the Canola Oil to about 200° F. in a 400 ml Pyrex beaker. The temperature is selected to ensure that the fat/oil component is completely liquefied. The

TABLE 8

|  | Percentage of Ingredient Component | Dry weight percentage of total formula |
|---|---|---|
| Microparticulated Ingredient Component | | |
| i) Fat/Oil Component | | |
| Reverse Osmosis Concentrated Milk | 67% | 50% |
| Half-and-Half Cream | 13% | 10% |
| ii) Protein Component | | |
| Microparticulated Whey Protein (Simplesse 100) | 20% | 15% |
| Secondary Ingredient Component | | |
| i) Emulsifier | | |
| Sodium Caseinate | 8% | 2% |
| Mono and Diglycerides | 4% | 1% |
| ii) Bulking Agent | | |
| Corn Syrup Solids | 88% | 22% |
| Total | | 100% |

A 100 g sample of the creamer composition of Table 8 is prepared by first heating the concentrated milk and the half-and-half cream to about 200° F. in a 400 ml Pyrex beaker. The temperature is selected to ensure that the fat/oil component is completely liquefied. The temperature is maintained at about 200° F. and 50 ml of water is added to the liquefied ingredients. Agitation is applied to the liquefied mixture using an IKA high shear mixer (available from the IKA-Werke Company of Germany). The IKA mixer is set on a No. 6 speed setting.

The microparticulated whey protein is added to the liquefied mixture in the continued presence of agitation. The sodium caseinate and the mono- and di-glycerides are added and agitation is continued for approximately 5 minutes. The corn syrup solids are added and the application of agitation is continued until all dry ingredients are thoroughly wetted, approximately 5 minutes.

The resulting mixture is then homogenized using an APV Gaulin Model15MR Homogenizer (available from the APV Gaulin Company of Denmark). The homogenizer is run at a first stage setting of 500 psi and a second stage setting 2000 psi. The resulting homogenized composition is dried to a free moisture content of about 3% utilizing an Yamato countercurrent bench top spray dryer.

Having now described several embodiments of the present invention it should be clear to those skilled in the art that the forgoing is illustrative only and not limiting, having been presented only by way of exemplification. Numerous other embodiments and modifications are contemplated as falling within the scope of the present invention as defined by the appended claims thereto.

We claim:

1. A creamer composition comprising:
   A) a microparticulated ingredient component comprising:
      i) from about 0.1% to about 80% of a fat/oil component;
      ii) from about 0.1% to about 70% of a microparticulated protein component;
      wherein in a hydrated state said microparticulated ingredient component particles have a mean diameter particle size distribution ranging from about 0.1 microns to about 10.0 microns, with less than about 5 percent of the total number of particles exceeding about 10.0 microns in diameter,
   B) a secondary ingredient component comprising:
      i) from about 0.05% to about 50% of an emulsifier;
      ii) from about 50% to about 99.5% of a bulking agent;
      wherein the weight ratio of the microparticulated ingredient component to the secondary ingredient component is in the range of from about 1:99 to about 5:1.

2. The creamer composition of claim 1 wherein said fat/oil component is selected from the group consisting of soybean oil, canola (low erucic acid) oil, corn oil, cottonseed oil, peanut oil, safflower oil, sunflower oil, rapeseed oil, sesame oil, olive oil, coconut oil, palm kernel oil, palm oil, tallow, butter, lard, fish oil, and mixtures thereof and said protein component is selected from the group consisting of plant proteins, dairy proteins, animal proteins, and mixtures thereof.

3. The creamer composition of claim 1 wherein said emulsifier is selected from the group consisting of stearic acid mono and diglycerides, palmitic acid mono and diglycerides, propylene glycol esters, lecithin, sucrose monoesters, polyethoxylated glycerols, lactylated mono and diglycerides, propylene glycol monoesters, polyglycerol esters, diacetylated tartaric acid esters of mono and diglycerides, citric acid esters of monoglycerides, stearoyl-2-lactylates, polysorbates, succinylated monoglycerides, acetylated monoglycerides, ethoxylated monoglycerides, lecithin, sucrose monoester, sorbitan esters, diacetyl tartaric acid ester monoglyceride, and mixtures thereof; and wherein said bulking agent is selected from the group consisting of corn syrup solids, maltodextrin and dextrose equivalents, starches, and mixtures thereof.

4. The creamer composition of claim 1 wherein said microparticulated ingredient component comprises from about 10% to about 70% of the fat/oil component and from about 5% to about 60% of the microparticulated protein component; and wherein said secondary ingredient component comprises from about 0.5% to about 25% of an emulsifier and from about 50% to about 90% of a bulking agent; and wherein the weight ratio of the microparticulated ingredient component to the secondary ingredient component is in the range of from about 1:50 to about 5:1.

5. The creamer composition of claim 4 wherein said microparticulated ingredient component comprises from about 20% to about 70% of the fat/oil component and from about 10% to about 50% of the microparticulated protein component; and wherein said secondary ingredient component comprises from about 0.5% to about 20% of an emulsifier and from about 50% to about 85% of a bulking agent; and wherein the weight ratio of the microparticulated ingredient component to the secondary ingredient component is in the range of from about 1:10 to about 5:1.

6. The creamer composition of claim 5 wherein said microparticulated ingredient component comprises from about 20% to about 60% of the fat/oil component and from about 10% to about 40% of the microparticulated protein component; and wherein said secondary ingredient component comprises from about 0.5% to about 15% of an emulsifier and from about 50% to about 80% of a bulking agent; and wherein the weight ratio of the microparticulated ingredient component to the secondary ingredient component is in the range of from about 1:5 to about 5:1.

7. The creamer composition of claim 1 wherein said microparticulated ingredient component additionally comprises from about 0.1% to about 70% of a carbohydrate component.

8. The creamer composition of claim 7 wherein said carbohydrate component comprises ingredients selected from the group consisting of zein protein, gum arabic, starch, cellulose, calcium alginate, cross-linked alginates, dextran, gellan gum, curdlan, konjac mannan, chitin, schizophyllan and chitosan, microcrystalline cellulose, and mixtures thereof.

9. The creamer composition of claim 8 wherein said carbohydrate component comprises microcrystalline cellulose.

10. A creamer composition solution prepared from the creamer composition of claim 1, wherein said creamer composition solution comprises about 35% water and about 65% of, wherein when the creamer composition solution is measured at about 37° C. the creamer composition solution has a viscosity in the range of from about 20 centipoises to about 60 centipoises.

11. The creamer composition of claim 1 wherein the microparticulated ingredient component further comprises from about 0.1% to about 50% of thickening agent.

12. A creamer composition comprising:
   a) a microparticulated ingredient component comprising:
      i) from about 0.1% to about 80% of a fat/oil component;
      ii) from about 0.1% to about 70% of a protein component;
      wherein in a hydrated state said microparticulated ingredient component particles have a mean diameter particle size distribution ranging from about 0.1 microns to about 10.0 microns, with less than about 5 percent of the total number of particles exceeding about 10.0 microns in diameter,
   b) a secondary ingredient component comprising:
      i) from about 0.05% to about 50% of an emulsifier;
      ii) from about 50% to about 99.5% of a bulking agent;
   c) an additional ingredient component;
   wherein the weight ratio of the microparticulated ingredient component to the secondary ingredient component is in the range of from about 1:99 to about 5:1, and wherein the weight ratio of the secondary ingredient component to the additional ingredient component is in the range of from about 100:1 to about 1:24.

13. The creamer composition of claim 12 wherein said fat/oil component is selected from the group consisting of soybean oil, canola (low erucic acid) oil, corn oil, cottonseed oil, peanut oil, safflower oil, sunflower oil, rapeseed oil, sesame oil, olive oil, coconut oil, palm kernel oil, palm oil, tallow, butter, lard, fish oil, and mixtures thereof and said protein component is selected from the group consisting of plant proteins, dairy proteins, animal proteins, and mixtures thereof.

14. The creamer composition of claim 12 wherein said emulsifier is selected from the group consisting of stearic acid mono and diglycerides, palmitic acid mono and diglycerides, propylene glycol esters, lecithin, sucrose monoesters, polyethoxylated glycerols, lactylated mono and diglycerides, propylene glycol monoesters, polyglycerol esters, diacetylated tartaric acid esters of mono and diglycerides, citric acid esters of monoglycerides, stearoyl-2-lactylates, polysorbates, succinylated monoglycerides, acetylated monoglycerides, ethoxylated monoglycerides, lecithin, sucrose monoester, sorbitan esters, diacetyl tartaric acid ester monoglyceride, and mixtures thereof; and wherein said bulking agent is selected from the group consisting of corn syrup solids, maltodextrin and dextrose equivalents, starches, and mixtures thereof.

15. The creamer composition of claim 12 wherein said microparticulated ingredient component comprises from about 10% to about 70% of the fat/oil component and from about 5% to about 60% of the microparticulated protein component; and wherein said secondary ingredient component comprises from about 0.5% to about 25% of an emulsifier and from about 50% to about 90% of a bulking agent; and wherein the weight ratio of the microparticulated ingredient component to the secondary ingredient component is in the range of from about 1:50 to about 5:1.

16. The creamer composition of claim 15 wherein said microparticulated ingredient component comprises from about 20% to about 70% of the fat/oil component and from about 10% to about 50% of the microparticulated protein component; and wherein said secondary ingredient component comprises from about 0.5% to about 20% of an emulsifier and from about 50% to about 85% of a bulking agent; and wherein the weight ratio of the microparticulated ingredient component to the secondary ingredient component is in the range of from about 1:10 to about 5:1.

17. The creamer composition of claim 16 wherein said microparticulated ingredient component comprises from about 20% to about 60% of the fat/oil component and from about 10% to about 40% of the microparticulated protein component; and wherein said secondary ingredient component comprises from about 0.5% to about 15% of an emulsifier and from about 50% to about 80% of a bulking agent; and wherein the weight ratio of the microparticulated ingredient component to the secondary ingredient component is in the range of from about 1:5 to about 5:1.

18. The creamer composition of claim 12 wherein said additional ingredient component comprises ingredients selected from the group consisting of flavorants, milk solids, soluble beverage components, buffers and buffering systems, natural and artificial sweeteners, thickeners, foaming agents and foaming systems, processing aids, and mixtures thereof.

19. The creamer composition of claim 12 wherein said microparticulated ingredient component additionally comprises from about 0.1% to about 70% of a carbohydrate component.

20. The creamer composition of claim 19 wherein said carbohydrate component comprises ingredients selected from the group consisting of zein protein, gum arabic, starch, cellulose, calcium alginate, cross-linked alginates, dextran, gellan gum, curdlan, konjac mannan, chitin, schizophyllan and chitosan, microcrystalline cellulose, and mixtures thereof.

21. The creamer composition of claim 20 wherein said carbohydrate component comprises microcrystalline cellulose.

22. A creamy beverage comprising the composition of claim 12 wherein said creamy beverage has a pH value in the range of from about 5.2 to about 7.5.

23. The creamy beverage of claim 22 wherein said additional ingredient component further comprises from about 0.1% to about 10% of a buffering system capable of maintaining the pH of the creamy beverage in a range of from about 5.2 to about 7.5 for a period of time in the range of from about 1 hour to about 3 hours.

24. A concentrated liquid creamer composition comprising:
   a) a microparticulated ingredient component comprising:
      i) from about 0.1% to about 80% of a fat/oil component;
      ii) from about 0.1% to about 70% of a protein component;
      wherein in a hydrated state said microparticulated ingredient component particles have a mean diameter particle size distribution ranging from about 0.1 microns to about 10.0 microns, with less than about 5 percent of the total number of particles exceeding about 10.0 microns in diameter,
   b) a secondary ingredient component comprising:
      i) from about 0.05% to about 50% of an emulsifier;
      ii) from about 50% to about 99.5% of a bulking agent;
   c) an additional ingredient component;
   d) water, wherein from about 20% to about 60% of the formula on a weight basis is comprised of said water; and,
   wherein the weight ratio of the microparticulated ingredient component to the secondary ingredient component is in the range of from about 1:99 to about 5:1, and wherein the weight ratio of the secondary ingredient component to the additional ingredient component is in the range of from about 100:1 to about 1:24.

25. A ready-to-use liquid creamer composition comprising:
   a) a microparticulated ingredient component comprising:
      i) from about 0.1% to about 80% of a fat/oil component;
      ii) from about 0.1% to about 70% of a protein component;
      wherein in a hydrated state said microparticulated ingredient component particles have a mean diameter particle size distribution ranging from about 0.1 microns to about 10.0 microns, with less than about 5 percent of the total number of particles exceeding about 10.0 microns in diameter,
   b) a secondary ingredient component comprising:
      i) from about 0.05% to about 50% of an emulsifier;
      ii) from about 50% to about 99.5% of a bulking agent;
   c) an additional ingredient component;
   d) water, wherein from about 65% to about 99% of the creamer composition formula on a weight basis is comprised of said water; and,
   wherein the weight ratio of the microparticulated ingredient component to the secondary ingredient component is in the range of from about 1:99 to about 5:1, and wherein the weight ratio of the secondary ingredient component to the additional ingredient component is in the range of from about 100:1 to about 1:24.

* * * * *